United States Patent [19]

Fagerberg

[11] 4,398,904
[45] Aug. 16, 1983

[54] MACHINE FOR PRODUCING BODIES OF CONICAL RECEPTACLES

[75] Inventor: Eric W. Fagerberg, Lilla Edet, Sweden

[73] Assignee: Inlands Aktiebolag, Lilla Edet, Sweden

[21] Appl. No.: 243,905

[22] PCT Filed: Jun. 25, 1980

[86] PCT No.: PCT/SE80/00177
§ 371 Date: Feb. 27, 1981
§ 102(e) Date: Feb. 27, 1981

[87] PCT Pub. No.: WO81/00081
PCT Pub. Date: Jan. 22, 1981

[30] Foreign Application Priority Data

Jul. 2, 1979 [SE] Sweden ............................... 7905763

[51] Int. Cl.³ .............................................. B31C 7/02
[52] U.S. Cl. .................................. 493/296; 493/155; 493/299
[58] Field of Search .............. 493/296, 303, 299, 155, 493/112

[56] References Cited

U.S. PATENT DOCUMENTS

| | | | |
|---|---|---|---|
| 1,270,890 | 7/1918 | Snyder | 493/296 |
| 2,013,748 | 9/1935 | Dunlap | 493/296 X |
| 3,095,156 | 6/1963 | Warnken | 493/155 X |
| 3,402,091 | 9/1968 | Trimble | 493/296 X |

FOREIGN PATENT DOCUMENTS

| | | | |
|---|---|---|---|
| 177254 | of 1917 | Canada | 493/155 |
| 256937 | 2/1913 | Denmark . | |

Primary Examiner—James F. Coan
Attorney, Agent, or Firm—Cushman, Darby & Cushman

[57] ABSTRACT

A machine for winding conical bodies of receptacles in a helical manner around a conical, rotating shaping member using webs of waste paper is disclosed.

5 Claims, 13 Drawing Figures

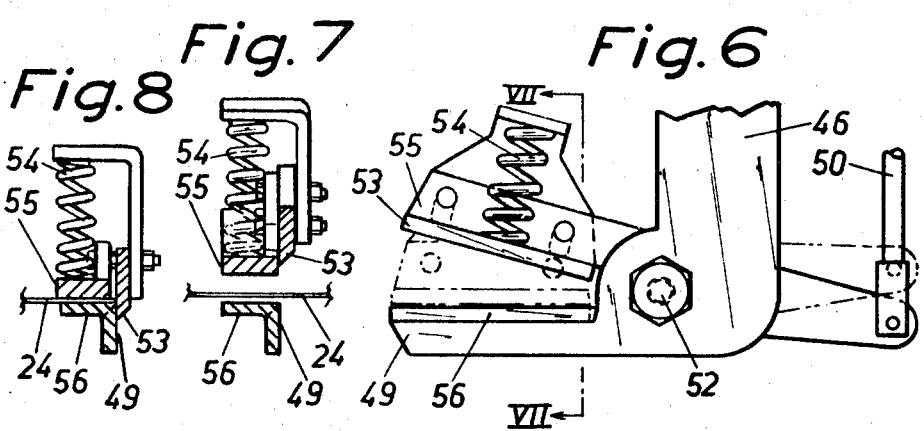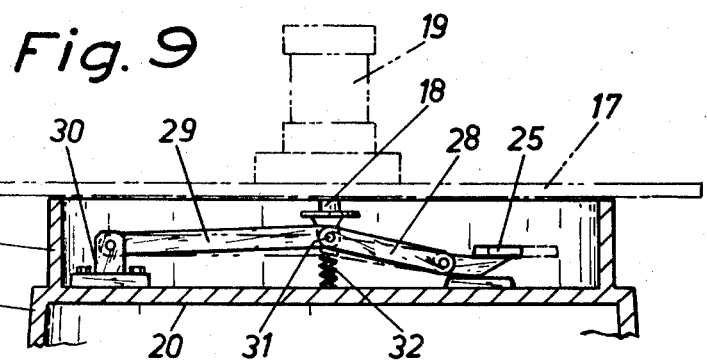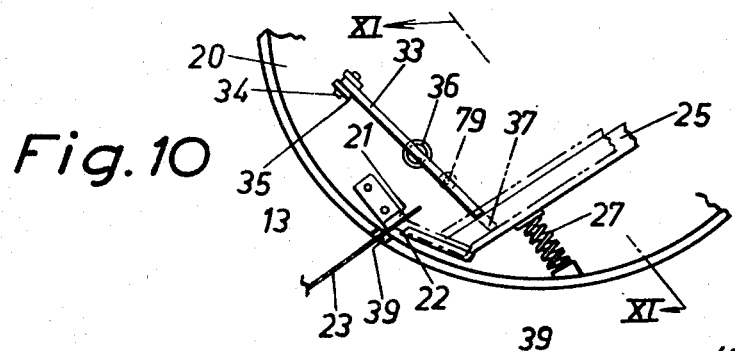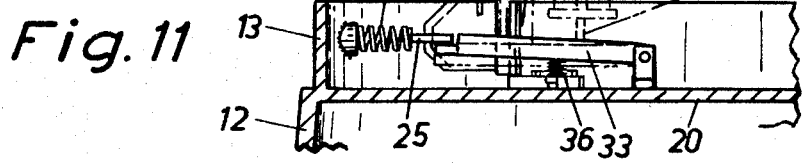

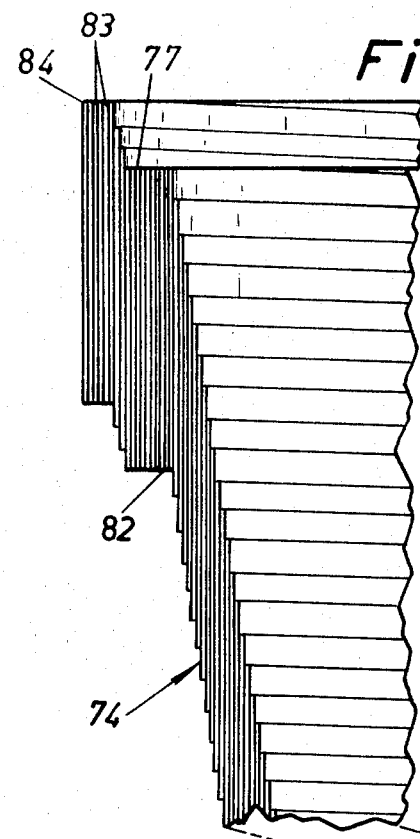
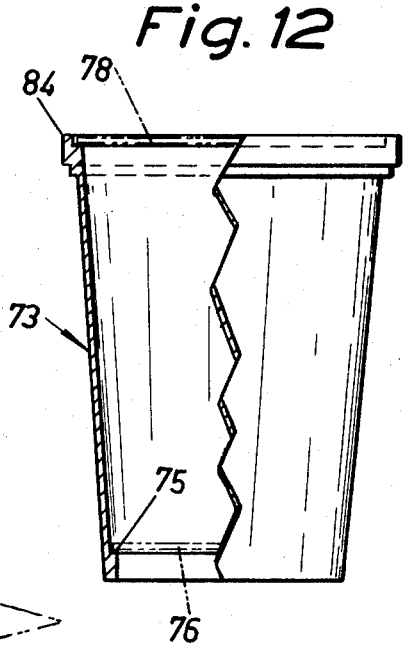
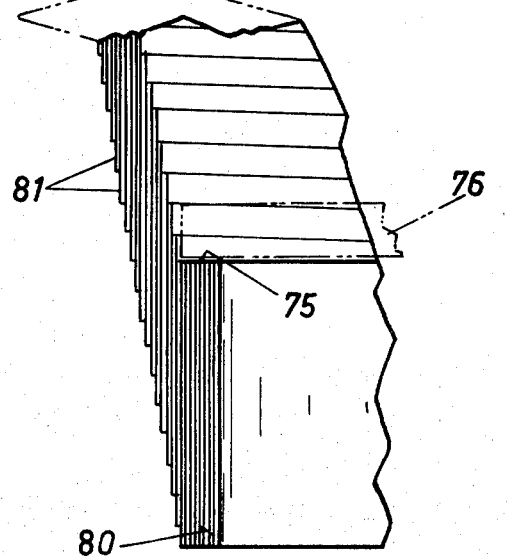

MACHINE FOR PRODUCING BODIES OF CONICAL RECEPTACLES

BACKGROUND OF THE INVENTION

In the manufacture of e.g. cardboard and paste board, the board web is wound into a roll from which are cut off rolls of the width of web ordered by the customers. One consequence is waste material in the form of board rolls of different lengths. Hitherto, this waste material has not found any practical application except as waste paper which is shredded to be re-used in the paper manufacture.

The purpose of the subject invention is primarily to provide a practical application for such waste material by using it to produce the conical bodies of receptacles. For this purpose, the waste material is cut into webs of a width of e.g. 40–60 millimeters which webs are wound in overlapping relationship, one winding turn partly overlapping the previous one, and glued together to form the conical bodies of receptacles of various kinds and intended for various purposes. At their smaller end the receptacles are formed with an inner shoulder on which a bottom piece may be supported. Also at their larger ends, the receptacles are preferably formed with an inner shoulder on which a lid may be supported. This is the case when the receptacles are used to hold e.g. granular or particulate materials.

The subject invention concerns a machine for producing the conical bodies of receptacles of this kind, using preferably waste material of the nature referred to above. The machine comprises a rotatably driven shaping member having a conical jacket face, a frame supporting a web of material in the form of a narrow strip wound into a roll, which web is intended to be used to form the conical receptacle bodies by being wound about the shaping member, a device adapted to removably secure the starting end of the material web to the smaller end of the shaping member, and a device to effect axial displacement of the shaping member relatively to the support frame during the rotation of the shaping member for the purpose of winding the web of material in helical winding turns around the conical jacket face of the shaping member while ensuring that the winding turns only partly overlap and adhere to each other with the aid of an adhesive.

SUMMARY OF THE INVENTION

It is characteristic of the invention that at its smaller end the shaping member is provided with a cylindrical portion the diameter of which is slightly smaller than the smallest diameter of the conical jacket face of the shaping member, that a guide lid is arranged to be moved towards the smaller end of the shaping member so as to cover said end for the purpose of guiding the web of material while the latter is being wound onto the shaping member, that a pair of jaws are arranged at the smaller end of the shaping member, one of the jaws being stationary while the other one is arranged for displacement towards and away from the stationary jaw, to clamp the starting end of the web of material to the shaping member, and that a slit is provided in the cylindrical portion of the smaller end of the shaping member, which slit is open towards the smaller end of the shaping member so as to allow reception therein of the starting end of the web which is introduced into the slit by means of a feeder arm to be clamped between the jaws.

BRIEF DESCRIPTION OF THE DRAWINGS

Further characteristics of the invention will appear from the following detailed description with reference to the accompanying drawings, wherein FIG. 6 illustrates on an enlarged scale the lower end of the web feeder arm provided with a scissor-like means as indicated in FIG. 2, FIG. 7 is a cross-sectional view through the scissors along line VII—VII of FIG. 6, with the scissor blades in their open position, FIG. 8 is a similar cross-sectional view showing the scissor blades in their operative position, FIG. 9 is a cross-sectional view along line IX—IX of FIG. 3 through the smaller end of the shaping member, FIG. 10 is a similar cross-sectional view along line X—X of FIG. 3, FIG. 11 is a section along line XI—XI of FIG. 10, FIG. 12 is a lateral view of a conical receptacle, shown partly in a longitudinal sectional view, FIG. 13 illustrates on an enlarged scale a sectional view through the jacket face of the receptacle, showing the position of the various winding turns one partly overlapping the other.

DETAILED DESCRIPTION OF A PREFERRED EMBODIMENT

Figure 1:
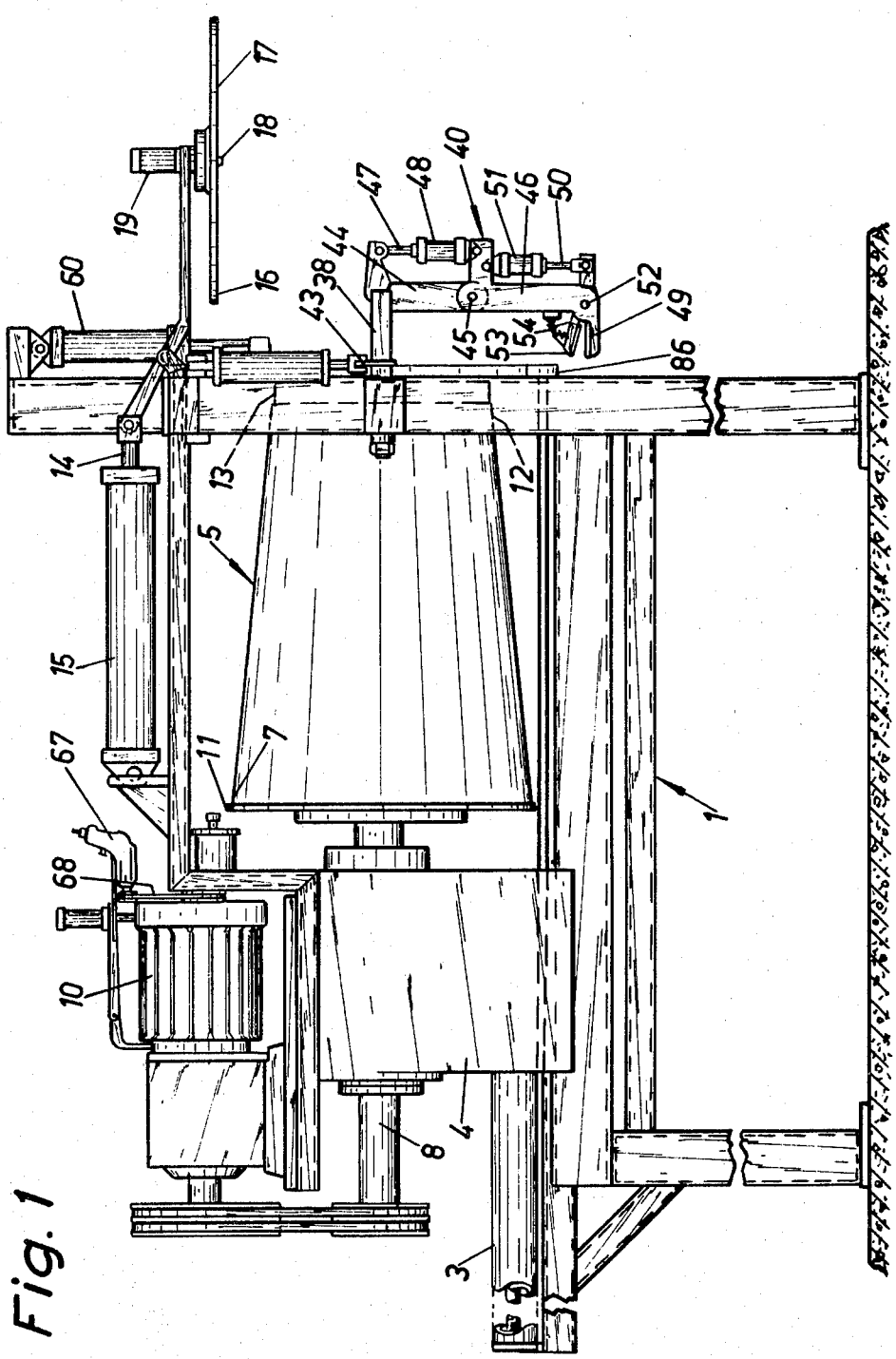
FIG. 1 is a lateral view of a machine in accordance with the invention showing the various components of the machine at the beginning of the winding operation.

The elongate frame 1 of the machine supports a sliding member 4 which is arranged for displacement in the lengthwise direction of the frame by means of a piston-and-cylinder unit 2, 3. At one end of the sliding member 4 is rotatably mounted a hollow cylinder 5 which is formed with a conical jacket face 6 and serves as a winding-turn shaping member. The hollow cylinder 5 is attached at its larger end 7 to a bearing shaft 8 and is driven by a motor 10 via V-belts 9. The larger end of the hollow cylinder 5 is provided with a guide flange 11 and its smaller end 12 with a flange 13 of cylindrical configuration, the outer diameter of which is smaller than the smallest diameter of the conical jacket face 6. A lid 17 is arranged to be lowered into position in front of the flange 13 by means of a piston-and-cylinder unit 14, 15, said lid 17 formed with a flange 16 serving to guide the material web. At its centre, the lid 17 also supports a piston-and-cylinder unit 18, 19 the function of which will be explained in the following.

Figure 3:
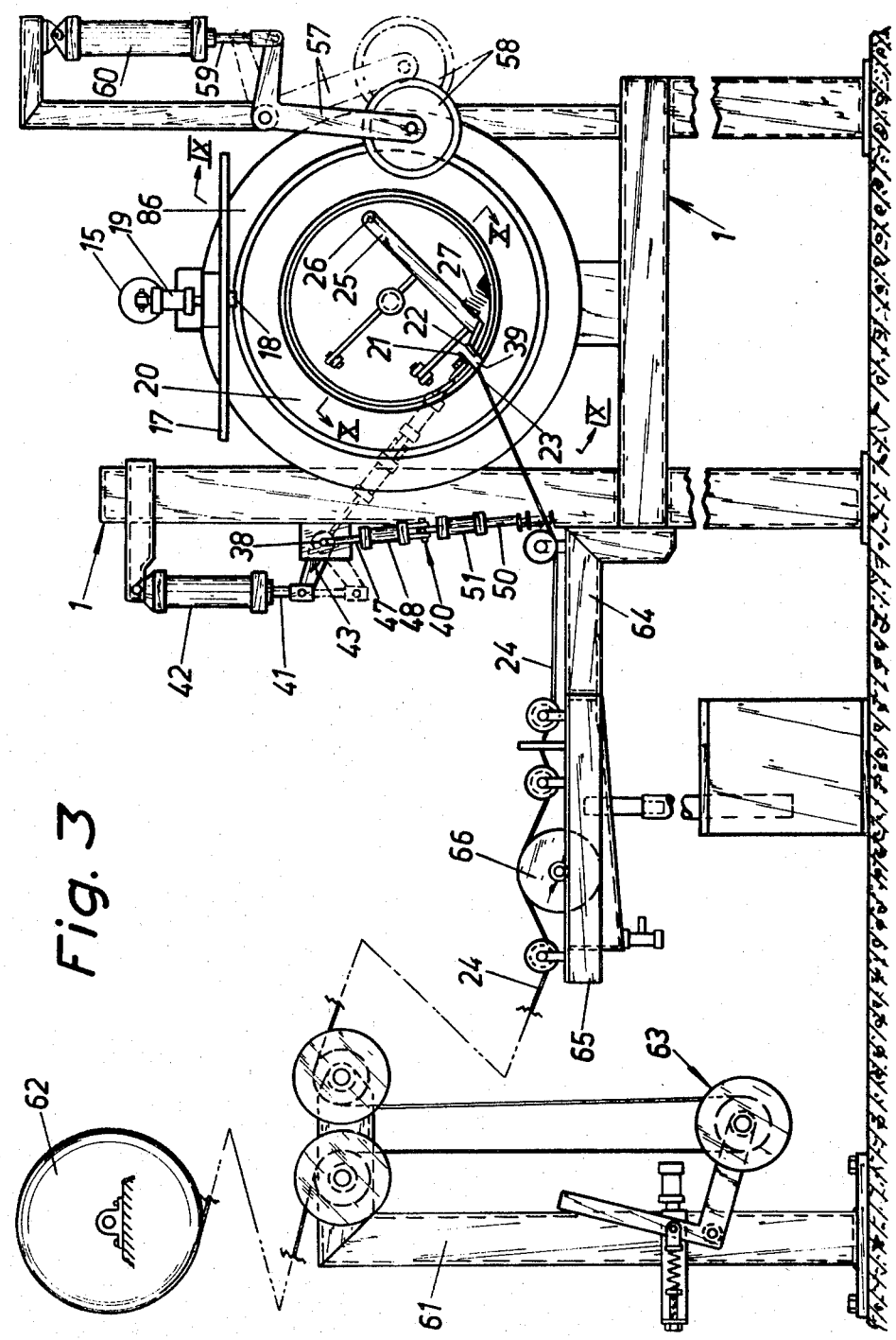
FIG. 3 is an end view of the machine, seen from the right with regard to FIGS. 1 and 2.
Figure 4:
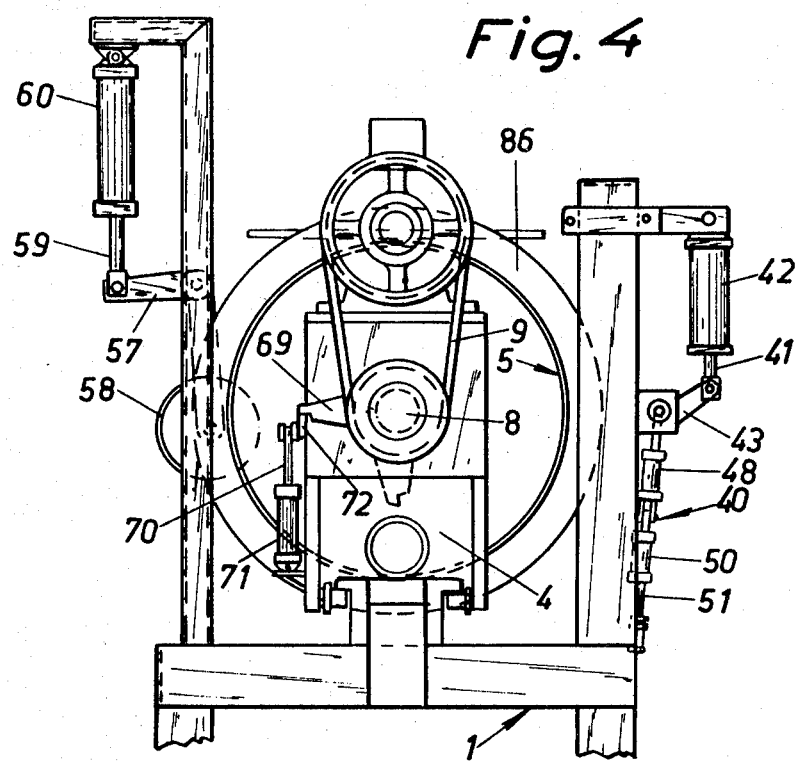
FIG. 4 is a view of the opposite end of the machine.

Internally of the flange 13 at the smaller end 12 of the winding-turn shaping member 5, which smaller end is provided with a bottom piece 20 is provided a stationary jaw 21 which together with a movable jaw 22 serves to clamp the starting end 23 of the strip-like web of material 24. The movable jaw 22 is arranged on the free end of an arm 25 the opposite end of which is mounted for pivotal movement about a bolt 26 arranged on said bottom piece 20. A steel spring 27 is arranged to urge the arm 25 into position against the stationary jaw 21. Two levers 28, 29 (FIG. 9) interconnected in a knee-joint fashion connect the arm 25 with a bracket 30 on the bottom piece 20 so as to ensure that when the articulation point (fulcrum) 31 interconnecting the levers 28 and 29 is forced downwards by the piston 18 against the action of a steel spring 32 to the position illustrated in FIG. 9 in dash-and-dot lines, the arm 25 together with the associated jaw 22 is turned away from the stationary jaw 21. In this inoperative position (FIG. 3) the arm 25 is caught by a locking pawl 33 one end of which is pivotally mounted for turning movement about a bolt 34 supported in a bracket 35 at the bottom piece 20 and its opposite end 37 is pivoted by a steel spring 36 to the locking position indicated in continuous lines in FIG. 10. Opposite the gap between the jaws 21, 22 the cylindrical flange 13 is formed with a slit 39 through which the starting end 23 of the web may be introduced laterally (i.e. from the right as seen in FIG. 1).

At one side of the machine frame 1 is provided a feeder arm 40 serving to pull the starting end 23 of the web 24 of material to a position opposite the slit 39. The upper end of the feeder arm 40 is mounted for pivotal movement on a horizontal shaft 38. The pivotal movement of the arm 40 is effected by means of a piston-and-cylinder unit 41, 42 and a lever 43 mounted on the shaft 38. The feeder arm 40 comprises one arm section 44 which is integral with the shaft 38 and one arm section 46 which by means of a shaft 45 is articulated to the lower end of the first arm section 44. A piston-and-cylinder unit 47, 48 pivots the arm section 46 about the shaft 45. At its lower end the arm section 46 supports the stationary blade 49 of a pair of scissors and as well as the other scissor blade 53 which is movable relative to the stationary blade about a shaft 52 with the aid of a piston-and-cylinder unit 50, 51. The movable scissor blade 53 supports a movable clamping jaw 55 which is biased by a spring 54 and which cooperates with a stationary jaw 56 supported by the stationary scissor blade 49.

On the opposite side of the frame 1, at the lower end of an angular lever arm 57 is rotatably mounted a press roller 58 which exerts a pressing action on the outher face 6 of the jacket of the shaping member 5 upon pivotal movement of the angular lever arm, effected by a piston-and-cylinder unit 59, 60.

At the side of the frame 1 where the feeder arm 40 is mounted is also arranged a support stand 61 holding a material supply roll 62 from which the web 24 of material is unreeled. A tensioning device 63 maintains the web 24 under adequate tension while it is being wound onto the shaping member 5. A glue pot 65 is supported by a bracket arm 64 and a glue-application roller 66 dips into the pot 65 and applies glue to the lower face of the web 24 of material.

The auxiliary motor 67 indicated in FIG. 1 is arranged to turn the shaping member 5 via V-belts 68 over a part of a revolution until a stop member 69 formed on the machine shaft 8 abuts against a retaining pawl 72 in a position wherein the slit 39 formed in the flange 13 is in an initial position, accessible to the free end of the feeder arm 40. A piston-and-cylinder unit 70, 71 is arranged to disengage the retaining pawl 72.

For easier understanding of the mode of operation of the machine, reference is initially made to FIGS. 12 and 13 which show the manner in which the various turns of the web of material are positioned one overlapping the other to form the conical body 74 of the finished receptacle 73 so that the various turns form an annular shoulder 75 to support the bottom 76 of the receptacle and another annular shoulder 77 to support the lid 78 of the receptacle (when used).

Figure 2:
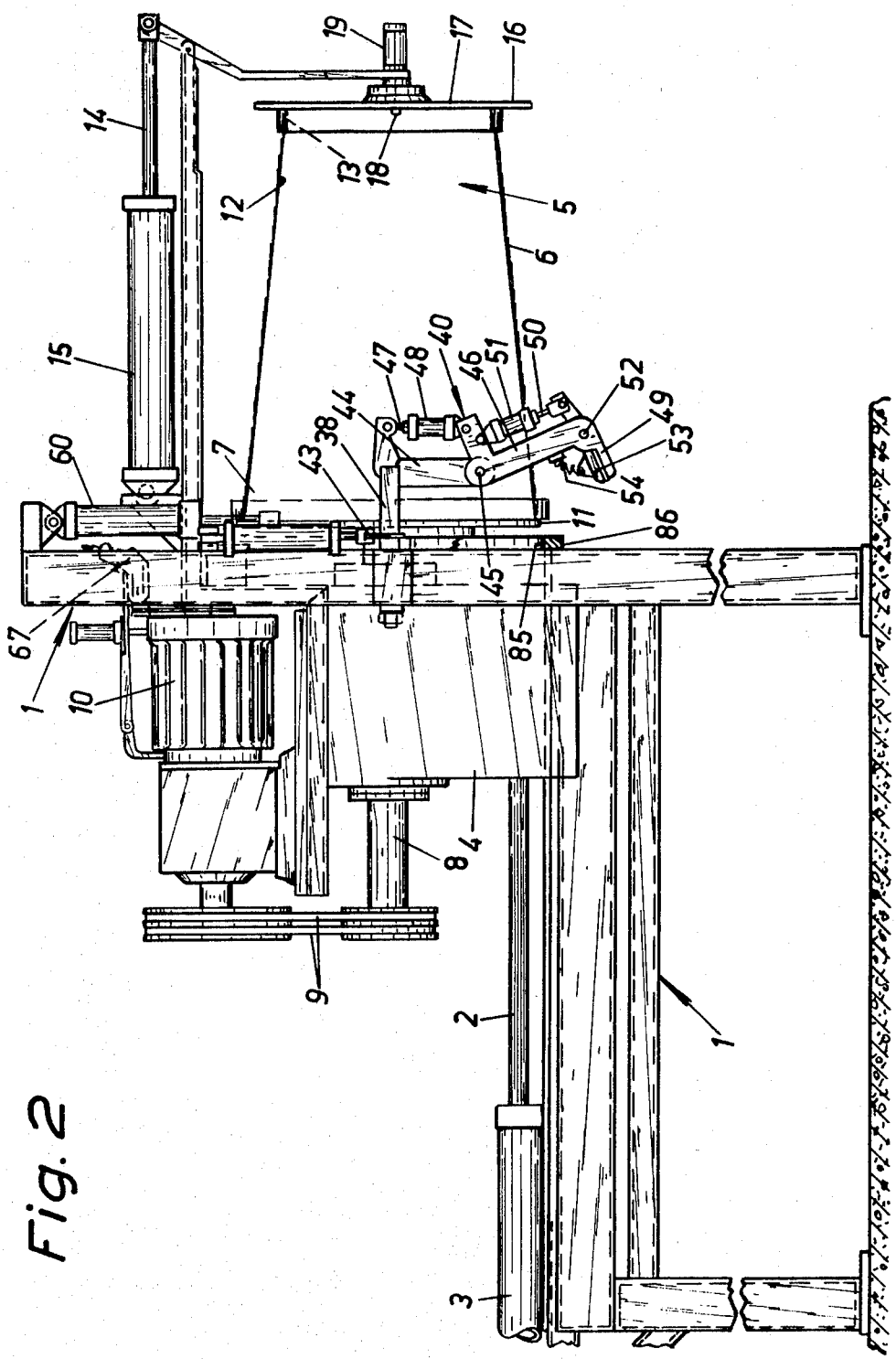
FIG. 2 is a similar lateral view of the machine showing the positions of the various components after completed winding operation.
Figure 5:
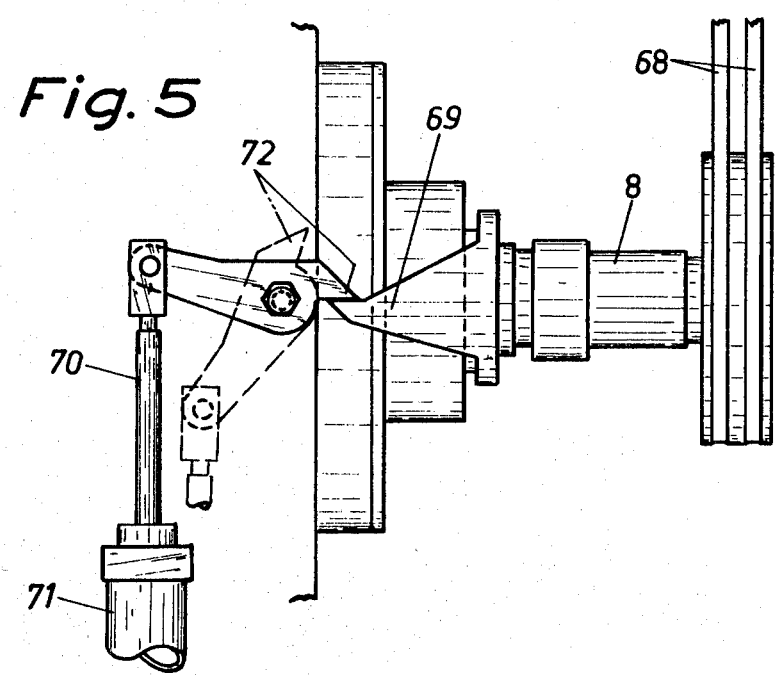
FIG. 5 illustrates on a somewhat larger scale and in a lateral view the disengagement device indicated in FIG. 4.

The board web 24 is introduced between the blades 49, 53 of the scissors and the web is cut off transversely by the scissors while at the same time the jaw 55 clamps the starting end of the web against the stationary jaw 56. The arm 40 pulls the web 24 to the position illustrated in FIG. 3 in dash-and-dot lines, ensuring that the starting end 23 is exactly opposite the slot 39. The piston-and-cylinder unit 2, 3 displaces the slide member 4 and together with the latter also the shaping member 5 over a small distance to the right as seen in FIG. 1, whereby the starting end 23 will be positioned inside the slit and in the space between the jaws 21 and 22. At the end of this short displacement of the shaping member 5 a set screw 79 (FIG. 11) on the feeder arm 40 abuts against the locking pawl 33, whereby the arm 25 is released and, through the action of the spring 27, the jaw 22 clamps the starting end 23 against the jaw 21. The piston-and-cylinder unit 50, 51 opens the blade 53 of the scissors and consequently also the jaw 55. The piston-and-cylinder unit 47, 48 swings the arm section 46 laterally while at the same time returning the feeder arm 40 to its starting position, shown in continuous lines in FIG. 3. However, the arm section 46 remains in the starting position shown in FIG. 2. The piston-and-cylinder unit 14, 15 moves the guide lid 17 down to the position in front of the flange 13, the piston-and-cylinder unit 70, 71 moves the retaining pawl 72 to the disengaged position of the latter, shown in dash-and-dot lines in FIG. 5 and the motor 10 is started. At the moment when the shaping member 5 starts to rotate and the winding-on of the web of material about the member 5 is begun, the piston-and-cylinder unit 59, 60 swings the press roller 58 against the outer face of the cardboard web 24 to ensure that the various winding turns adhere to one another, glued together by the binding agent applied to one of the web faces. The initial winding turns 80 are guided by the flange 16 on the guide lid 17. These winding turns are applied in such a manner that they cover one another completely. The slide member 4 is thereafter displaced by the piston-and-cylinder unit 2, 3 while the rotation of the shaping member 5 to the right as seen in FIGS. 1 and 2 continues. The subsequent winding turns 81 will therefore overlap only partly. When the conical body 73 has been given sufficient height, the axial displacement of the slide member 4 ceases and a number of winding turns 82 are applied covering one another completely, thus forming the flange 77. The slide member 4 is thereafter displaced over a further short distance to the right and a number of winding turns 83 are applied so as to cover one another completely to form the upper guide flange 84 serving to support the lid 78. The arm section 46 is swung in the clockwise direction as seen in FIG. 2, and the web 24 is cut off by the scissors 49, 53. The rotation of the shaping member 5 continues until the winding-on of the trailing end of the web has been completed.

The piston-and-cylinder unit 18, 19 returns the jaw 22 to its inoperative position and through the action of the spring 36 the locking pawl 33 catches the arm 25. The guide lid 17 is then moved back to its starting position (FIG. 1) by the piston-and-cylinder unit 14, 15. During the winding, the outer diameter of the guide flange 84 of the jacket face 74 of the receptacle becomes larger than the inner diameter 85 of an annular flange 86, which is attached to the frame 1. The shaping member 5 is arranged to pass through this annular flange and the result is that when the sliding member 4 and consequently the shaping member 5 are moved back to their original positions (to the left as seen in FIG. 2) by the piston-and-cylinder unit 2, 3, the finished receptacle body 74 will be pushed axially away from the shaping member 5 upon abutment of the guide flange 84 against this annular flange 86. The completed receptacle thus will slide off the shaping member at the small end of the latter.

When the slide member 4 together with the shaping member 5 have returned to their initial positions, the various operational steps of the machine will be repeated to produce another receptacle body 74.

The machine as shown and described herein is to be regarded as an example only and the various parts and components of the machine may be altered in a variety of ways within the scope of the appended claims. The lines supplying pressurized medium to the various cylinders have been omitted from the drawings in order not to unnecessarily clutter the latter. Activation and deactivation of the valves in these lines as well as activation and deactivation of the coupling means incorporated in the machine may be controlled electrically and computerized to make the entire winding operation fully automated. The auxiliary motor 67 may be omitted, provided the machine is instead equipped with a coupling designed to control the operational phases of the machine shaft 8 effecting the turning of the shaping member 5 to the initial position thereof.

What we claim is:

1. A machine for producing the bodies of conical receptacles having an inner annular bottom shoulder, said machine comprising
    a rotatably driven shaping member having a conical jacket face,
    a frame supporting a web of material in the form of a narrow strip wound into a roll, which web is intended to be used to form the conical bodies of the receptacles by being wound about the shaping member,
    a device adapted to releasably secure the starting end of the web of material to the smaller end of the shaping member, and
    a device to effect axial displacement of the shaping member relative to the support frame during the rotation of the shaping member for the purpose of winding the web of material in helical winding turns around the conical jacket face of the shaping member while ensuring that the discrete winding turns only partly overlap in this area and adhere to each other by means of an adhesive,
    a cylindrical portion provided at the smaller end of the shaping member the diameter of which portion is slightly smaller than the smallest diameter of the conical jacket face of the shaping member, characterized in that
    a guide lid is arranged to be moved towards the smaller end of the shaping member so as to cover said end for the purpose of guiding the web of material while the latter is being wound onto the shaping member,
    that a pair of clamping jaws are arranged at the smaller end of the shaping member, one of the jaws being stationary while the other one is arranged for displacement towards and away from the stationary jaw to clamp the starting end of the web of material to the shaping member,
    that a slit is provided in the cylindrical portion of the smaller end of the shaping member, which slit is open towards the smaller end of the shaping member so as to allow reception of the starting end of the web,
    and a feeder arm arranged to introduce into the slit said starting web end to be clamped between the jaws.

2. A machine as claimed in claim 1, characterised in that at its free end the web feeder arm is provided with a pair of scissors for severing the web of material transversely, and with means for releasably securing the starting end of the web while the web feeder arm is pulling the web end towards said jaws.

3. A machine as claimed in claim 1, characterised in that an abutment means (e.g. a set screw) is provided on said web feeder arm, said means arranged, in the initial stage of the axial displacement of the shaping member, in which stage a locking pawl retains the movable jaw in a position spaced from the stationary jaw against the section of a spring, to push aside the locking pawl in order to allow the movable jaw to clamp the starting end of the web of material against the stationary jaw.

4. A machine as claimed in claim 3, characterised in that the guide lid is provided with a displaceable piston arranged in its operative position to displace the movable jaw away from the stationary jaw to a position wherein the locking pawl releasably retains the movable jaw in the neutral position thereof against the action of the spring.

5. A machine as claimed in claim 1, characterised in that the shaping member is arranged to be pushed through a stationary annular member the internal diameter of which only slightly exceeds the external diameter of the shaping member at the larger end of the latter, whereby upon return movement of the shaping member to its original position the larger end of the shaping member will abut against said annular member, thus causing the completed receptacle supported on the shaping member to be pushed axially off the latter at the smaller shaping member end.

* * * * *